L. E. WORKMAN.
ROTARY GAS ENGINE.
APPLICATION FILED OCT. 17, 1916.

1,298,140.   Patented Mar. 25, 1919.

Inventor:
Lewis E. Workman
By  Bransdoff
Attorney.

UNITED STATES PATENT OFFICE.

LEWIS E. WORKMAN, OF LOS ANGELES, CALIFORNIA.

ROTARY GAS-ENGINE.

1,298,140.  Specification of Letters Patent.  Patented Mar. 25, 1919.

Application filed October 17, 1916. Serial No. 126,191.

*To all whom it may concern:*

Be it known that I, LEWIS E. WORKMAN, a citizen of the United States, residing at Los Angeles, Calif., have invented a new and useful Improvement in Rotary Gas-Engines, of which the following is a specification.

My invention relates to engines and consists of the novel features herein set forth.

Figure 1:
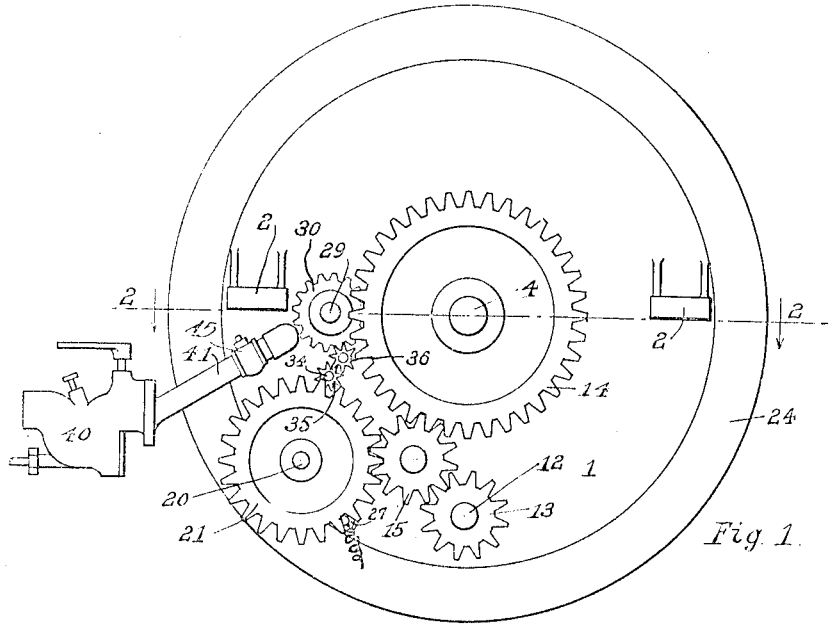
Figure 1 is a side elevation of an engine embodying the principles of my invention, looking in the direction of the arrow 1 in Fig. 2.
Figure 2:
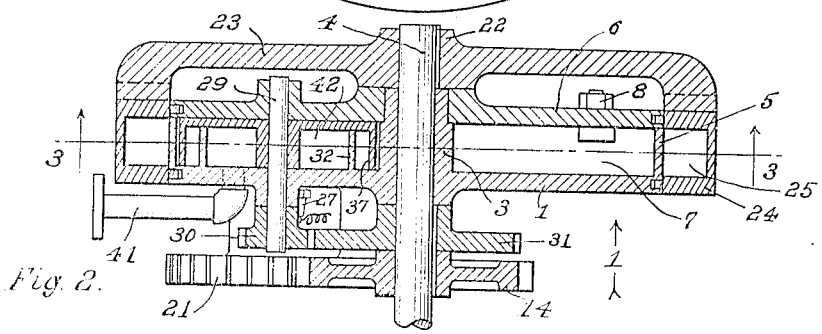
Fig. 2 is a horizontal sectional detail on the line 2—2 of Fig. 1.
Figure 3:
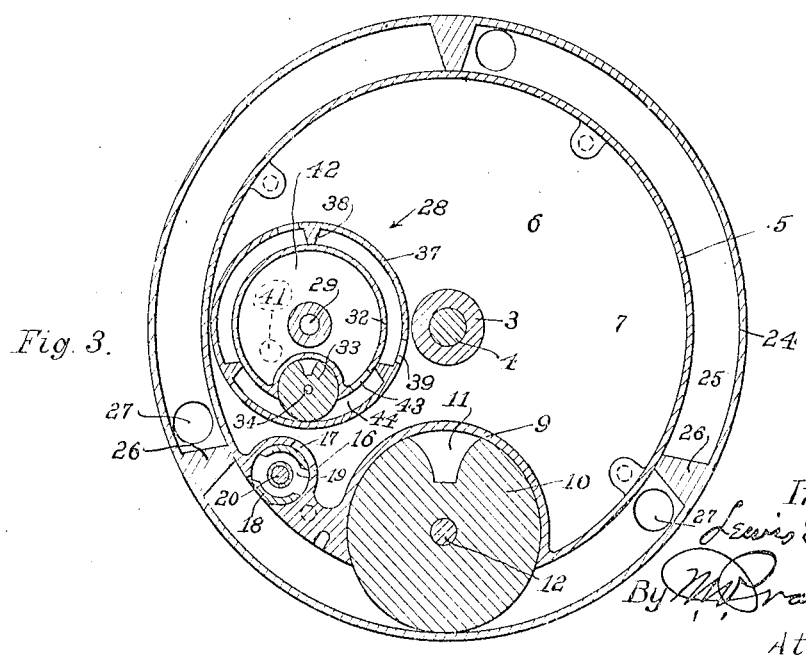
Fig. 3 is a sectional elevation on a plane parallel with Fig. 1, as indicated by the line 3—3 in Fig. 2.

The disk 1 is rigid with the supporting brackets 2 and said supporting brackets may be rigidly fixed to any suitable foundation to hold the disk rigid and non-rotatable, preferably in a vertical position. The hub 3 extends laterally from the center of the disk 1 and the shaft 4 extends rotatably through the hub 3. The rim 5 extends from the disk 1 concentric to the hub 3. The second disk 6 is fixed upon the hub 3 and fits against the rim 5, thereby forming the gas chamber 7, and is held in place by ears and bolts 8. The rim 5 is mutilated to form the rotary piston housing 9 and the rotary piston 10 is rotatably mounted in said housing and extends partly beyond the periphery of the rim 5, said rotary piston having the clearance space 11 for passing the traveling pistons. The shaft 12 extends through the disk 1 and is fixed in the rotary piston 10, and said shaft 12 is operatably connected to the shaft 4 by spur gears 13 and 14 fixed on said shafts and the idler gear 15 connecting the gears 13 and 14. The rim 5 is also mutilated to form the rotary valve casing 16 having the inlet port 17 leading from the chamber 7, and discharging through the rim 5. The rotary valve 18 is mounted in the valve casing 16 and has a transverse passage 19 for intermittently registering with the port 17, and said valve is fixed on the shaft 20 connected to the idler 15 by the gear 21.

The hub 22 is fixed upon the shaft 4 and the web 23 extends outwardly from the hub 22. The engine rotor 24 is rigidly fixed to the web 23 and fits rotatably against the rim 5, said rotor having an internal channel 25, interrupted by cross piston 26 and there being exhaust ports 27 leading from the channel 25 on the opposite sides of the pistons 26 from the intake. The periphery of the piston 10 travels in the channel 25 and the space 11 clears the traveling pistons. The rotor 24 drives the shaft 4 thereby driving the gears to operate the rotary piston 10 and valve 18, and the gears are timed to open the valve just as the traveling pistons pass the valve, and then the valve closes and the charge is fired by the spark plug 27.

Power may be transmitted from the periphery of the rotor 24 by a bolt or chain or in any suitable way.

The rotary pump 28 is practically of the same construction as the engine, just described, only on a smaller scale. The pump shaft 29 is rotatably mounted through the disks 1 and 6 and operatively connected to the shaft 4 by spur gears 30 and 31. The rigid pump rim 32 extends from the face of the disk 1 and is mutilated to form a housing for the pump rotary piston 33, the shaft 34 of which is connected to the gear 30 by the gear 35 and the idler 36. The pump rotor 37 is fixed to the shaft 29 and fits the rim 32 and has traveling pistons 38 and exhaust ports 39 discharging into the chamber 7. The gasolene is connected to the carbureter 40 and the carbureter 40 is connected by the pipe 41 which is provided with a check valve 45, of ordinary construction, for the purpose of preventing loss of pressure in chamber 7, when the ports in the rigid pump rim 32 register with the ports in the pump rotor 37, which is but a minute portion of its rotation. The pipe 41, is arranged to discharge through the disk 1 to the chamber 42 within the rim 32 and a port 43 leads through the rim to the chamber 44 of the pump rotor 37, so that when the engine rotor 24 is started the pump 28 will supply explosive mixture through the valve 18 to continue the operation.

I claim:

A rotary gas engine comprising a rotary case member rotatively mounted upon a hollow disk member, said hollow disk member constituting a compression chamber, a rotary piston fitted rotatively in the periphery of said hollow disk member and communicating with the working chambers of said engine and coacting with pistons fixed upon the inner surface of the rotary case member, a feed valve housed in the periphery of the said rotary disk member and communicating with the interior of the said stationary disk member and the working chamber of the said engine, a rotary pump located within the compression chamber of the stationary disk member and coacting with the said feed valve to supply gas under compression to said engine.

In testimony whereof, I affix my signature.

LEWIS E. WORKMAN.